(12) United States Patent
Redecker

(10) Patent No.: US 8,678,318 B2
(45) Date of Patent: Mar. 25, 2014

(54) INSULATION ARRANGEMENT IN AN AIRCRAFT

(75) Inventor: Robert Redecker, Hamburg (DE)

(73) Assignee: Airbus Operations GmbH (DE)

( * ) Notice: Subject to any disclaimer, the term of this patent is extended or adjusted under 35 U.S.C. 154(b) by 139 days.

(21) Appl. No.: 13/298,393

(22) Filed: Nov. 17, 2011

(65) Prior Publication Data

US 2012/0119024 A1   May 17, 2012

Related U.S. Application Data

(60) Provisional application No. 61/414,551, filed on Nov. 17, 2010.

(30) Foreign Application Priority Data

Nov. 17, 2010   (DE) .......................... 10 2010 051 654

(51) Int. Cl.
*B64C 1/40*   (2006.01)

(52) U.S. Cl.
USPC ........................................................ 244/131

(58) Field of Classification Search
USPC ...................... 244/1 N, 131, 132, 119, 118.5; 29/525.01, 525.13; 296/39.3
See application file for complete search history.

(56) References Cited

U.S. PATENT DOCUMENTS

| 2,160,066 | A | * | 5/1939 | Frische ...................... 52/407.1 |
| 5,275,529 | A | * | 1/1994 | Langenbrunner et al. .... 415/119 |
| 5,866,231 | A | | 2/1999 | Bodin et al. |
| 6,712,316 | B2 | * | 3/2004 | Jones ............................ 244/132 |
| 7,422,178 | B2 | * | 9/2008 | DeLaune ...................... 244/132 |
| 7,584,582 | B1 | * | 9/2009 | Hutter, III ................. 52/506.02 |
| 2003/0042363 | A1 | | 3/2003 | Dussac et al. |
| 2008/0308676 | A1 | * | 12/2008 | Muller ......................... 244/119 |
| 2009/0090812 | A1 | * | 4/2009 | Boock et al. .................. 244/1 N |
| 2010/0320323 | A1 | * | 12/2010 | Mueller et al. ............. 244/129.1 |
| 2012/0037764 | A1 | | 2/2012 | Stephan et al. |
| 2013/0020434 | A1 | * | 1/2013 | Muller et al. ................. 244/1 N |

FOREIGN PATENT DOCUMENTS

WO   2010122122 A1   10/2010

* cited by examiner

*Primary Examiner* — Tien Dinh
(74) *Attorney, Agent, or Firm* — Lerner, David, Littenberg, Krumholz & Mentlik, LLP

(57) ABSTRACT

An insulation arrangement with a holding device that comprises a collar forms an overlapping region between a second insulating package and the collar such that incidental condensation water on a first insulation package drains to the second insulating package along the collar under the influence of the gravitational force and from there into a bilge of the aircraft equipped with the insulation arrangement on a waterproof cover film of the second insulating package. This prevents condensation water from dripping into a passenger cabin.

11 Claims, 5 Drawing Sheets

INSULATION ARRANGEMENT IN AN AIRCRAFT

CROSS-REFERENCE TO RELATED APPLICATIONS

This application claims the benefit of the filing date of U.S. Provisional Patent Application No. 61/414,551 filed Nov. 17, 2010, the disclosure of which is hereby incorporated herein by reference.

TECHNICAL FIELD

The invention pertains to an insulation arrangement for thermally and acoustically insulating a cabin of an aircraft with at least one holding device and at least one insulation package. The invention furthermore pertains to a cabin holder for holding installations in a cabin of an aircraft, as well as to an aircraft with a cabin and an insulation arrangement according to the invention.

BACKGROUND OF THE INVENTION

According to the state of the art, various holding devices are used for mounting components in aircraft cabins, wherein these holding devices are fixed, for example, in aircraft fuselages on a primary fuselage structure of the aircraft by means of a rivet joints. During the manufacture of the aircraft, cabin components such as side paneling, kitchens ("galleys"), overhead storage compartments ("hatracks"), partition walls or other components can subsequently be installed on these holding devices.

An insulation arrangement for thermally and acoustically insulating the aircraft cabin is usually situated between the paneling of the aircraft cabin and the fuselage structure. The admission of relatively humid cabin air into an intermediate space between the insulation arrangement and the skin of the aircraft through the cabin paneling cannot be avoided because the cabin paneling is not airtight and a temperature gradient between the cabin and the intermediate space exists in-flight. A seal on insulation packages toward the skin of the aircraft normally ensures that condensation water is not admitted into the passenger cabin, but rather drains into a lower fuselages region that is referred to as the so-called "bilge" in aircraft along the insulation arrangement.

In order to fix cabin components on the holding devices, the insulation arrangement needs to be provided with cutouts, through which the holding devices protrude from the fuselage structure into the cabin. At these passages, condensation water from the skin may pass through the insulation arrangement. Condensation water can ultimately be admitted into the cabin because the cabin components arranged on the holding devices are furthermore not completely tight and gaps that are not completely sealed with sealing tapes or the like may exist between adjacent cabin components. In unfavorable instances, the concerned regions of the insulation arrangement are situated above passenger seats such that condensation water can drip down on the passengers. This phenomenon is also referred to as "rain in the plane."

BRIEF SUMMARY OF THE INVENTION

An embodiment of the invention includes an insulation arrangement that serves for thermally and acoustically insulating a cabin of an aircraft. and the insulation arrangement comprises holding devices and insulation packages, wherein the holding devices can protrude through the insulation packages without incidental condensation water being able to drip into the cabin.

Such an insulation arrangement, as far as possible, preferably does not lead to a higher weight than a conventional insulation arrangement. Furthermore, it preferably has an identical or improved insulation quality and preferably ensures that the insulation package is securely held.

According to an advantageous embodiment, the insulation arrangement for thermally and acoustically insulating a cabin of an aircraft comprises at least one holding device, a first insulation package and a second insulation package, wherein the holding device comprises a first mounting surface for mounting the holding device on a structural component of the aircraft and a holding flange that extends from the first mounting surface and is provided with a peripheral collar, wherein the first insulation package comprises an opening for leading through the holding flange and an elastic, pliable insulation piece that is arranged on the opening and provided with a cutout that is narrower than the holding flange extending through the opening, and wherein the second insulation package comprises an end and is arranged on the structural component of the aircraft relative to the holding device in such a way that the end and the collar form an overlap, in which the collar lies between the end of the second insulation package and the first mounting surface.

Such an insulation arrangement according to an embodiment of the invention provides the significant advantage that it is not necessary to realize a transition between the holding flange and a first insulation package arranged on the holding flange in a watertight fashion. Due to the overlapping region between the collar of the holding flange and the second insulation package, the collar on the holding flange that holds the first insulation package in its position becomes a condensation water guide surface. This essentially means that incidental condensation water forming on the structure of the aircraft encounters a boundary of the first insulation package on the structure side that is usually lined with a watertight film. The condensation water subsequently drains to the holding flange and along this holding flange in order to ultimately drip off the collar and into the overlapping region. Since the second insulation package usually also comprises a waterproof film lining on the structure side, any condensation water arriving at this location can drain to a bilge or another region on the underside of the aircraft fuselage along the structure on this film. This eliminates the risk of condensation water dripping into the passenger cabin. Furthermore, a device that makes it possible to transport condensation water outward from the fuselage of the aircraft is usually provided in a bilge such that incidental and inflowing condensation water is always removed from the aircraft.

Due to this combination of a holding device with a collar, as well as an overlapping region, there practically exist no additional components that would result in additional weight such that the overall weight of the insulation arrangement according to an embodiment of the invention is not higher than that of a conventional insulation arrangement. The design of the cutout of the insulation piece makes it possible to hold the first insulation package in a reliable and positionally stable fashion, wherein the first insulation package is prevented from sliding off by the collar. Consequently, no additional precautions are required for mounting the first insulation package.

In this context, the term "structural component" is not limited to a reinforcing element in the form of a frame, a stringer or the like, but rather may also consist of any element of an aircraft structure that defines the shape of the corresponding aircraft. In addition to reinforcing elements, this naturally may also include individual shell elements of a fuselage wall or other components that form or reinforce the aircraft structure or are arranged thereon.

In an advantageous embodiment, the holding flange comprises a widening region that is arranged between the collar and the first mounting surface and dimensioned such that the insulation piece produces a non-positive connection in the widening region. An elastic, pliable insulation piece can be reliably held due to the widening region of the holding flange that is bounded by the peripheral collar. The widening region always pushes the insulation piece toward the collar in case it shifts on the holding flange.

In an advantageous embodiment of the invention, the insulation piece is manufactured of a foam material that is preferably realized in a closed-cell fashion. If the cells are closed, there practically is no risk of water diffusing into and accumulating in the insulation piece, but the water would rather drain along the collar on the insulation piece in an unobstructed fashion.

At this point, it should be emphasized that the concrete design of the insulation piece can be realized in a relatively arbitrary fashion as long as the contact with the collar of the holding flange can be ensured. It is preferred to choose geometrically simple shapes such as a quadrangle with optionally rounded corners. It would also be conceivable to use any other shapes. The choice of the shape is not intended to influence the scope of protection. The type of mounting of the insulation piece on the first insulation package can also be chosen arbitrarily and is not intended to restrict the invention. The insulation piece could be placed, for example, on a cover film of an insulating material such that conventional insulation packages can be easily adapted. Likewise, the insulation piece could also be enclosed by a cover film and integrated into an insulating material. This would be particularly space-saving and advantageous, but also require the modification of conventional or already existing insulation packages.

In a preferred embodiment, the first mounting surface is equipped with rivet bores that allow the mounting on a structural component of the aircraft fuselage by means of rivets. Due to the combination of the collar with the widening region of the holding flange, it suffices to utilize a single collar on the holding flange and an additional collar for being positively connected to the insulation piece closer to the first mounting surface is not required. This allows a relatively slender design of the holding flange, through which conventional riveting tools can be inserted into the rivet bores in the first mounting surface of the holding device without being obstructed by the holding flange or the collar arranged thereon.

In an advantageous embodiment, the holding flange extends perpendicular to the first mounting surface such that the rivet bores in the first mounting surface are impaired as little as possible.

In a preferred embodiment, the angle, at which the peripheral collar extends relative to the mounting surface, lies in the range between 0-45°. This makes it possible to ensure that arriving condensation water can flow to the second insulation package on the collar, particularly if the holding device is mounted on structural components of an aircraft fuselage in the upper quarter of the fuselage. Since the drainage of the condensation water takes place under the influence of the gravitational force only, a sufficient incline always needs to be provided on the collar.

In an advantageous embodiment of the invention, the peripheral collar extends from the holding flange by 2-5 mm. Due to this measure, the mounting surface is impaired very little by riveting tools such that an improved utilization of the riveting tools can be achieved. Such an extent also suffices for reliably holding the insulation piece. In this context, it should be generally noted that foam materials with greater dimensional stability require a smaller extent of the collar than less dimensionally stable foam materials.

In an equally advantageous embodiment, the collar extends parallel to a vertical line of an axis, along which the holding flange extends. The collar therefore is realized in the form of a plane rectangle and extends on the holding flange at a constant height. Due to this measure, the manufacture of the holding device is particularly simple and a superior holding effect is achieved. The insulation piece preferably has rounded corners such that the introduction of the holding force into the first insulation package is harmonized.

In an equally advantageous embodiment, the shape of the collar does not extend completely parallel to a vertical line of an axis, along which the longitudinal axis of the holding flange extends. The resulting shape of the collar therefore deviates from a plane rectangle and is bent. This is particularly sensible in instances, in which the angle relative to the structural component is excessively large or excessively small in a predefined mounting position of the holding device within the fuselage of the aircraft and the drainage effect of a plane collar for condensation water would not be optimal. An improved drainage effect can be achieved with a curvature that could extend in an approximately shovel-like fashion.

BRIEF DESCRIPTION OF THE DRAWINGS

Other characteristics, advantages and possible applications of the present invention result from the following description of exemplary embodiments and the figures. In the figures, identical or similar elements are furthermore identified by the same reference symbols.

DETAILED DESCRIPTION

Figure 1:
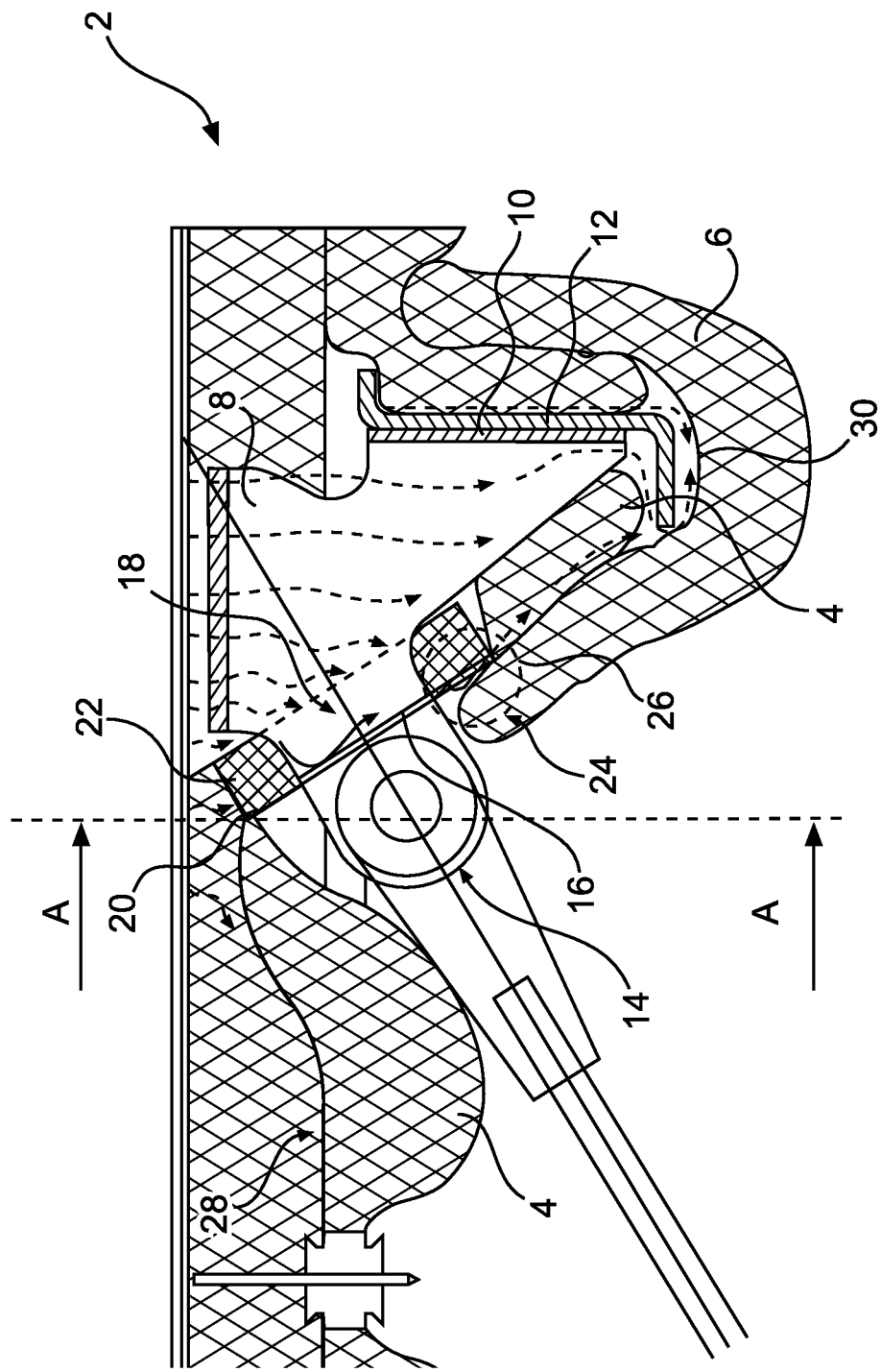
FIG. 1 shows a sectional representation of an insulation arrangement according to an embodiment of the invention.

FIG. 1 shows a sectional representation of an insulation arrangement 2 according to an embodiment of the invention with a first insulation package 4, a second insulation package 6 and a holding device 8 that is arranged on a structural component 12 with a first mounting surface 10. The holding device 8 comprises a holding flange 14 that perpendicularly extends from the first mounting surface 10 and comprises a peripheral collar 16, as well as a widening region 18 that is arranged between the peripheral collar 16 and the first mounting surface 10.

The first insulation package 4 comprises an opening 20 that serves for leading through the holding flange 14 and on which an insulation piece 22 made of a pliable, elastic material is arranged. This material could consist, for example, of a closed-cell foam material that is sufficiently compressible for being placed into the widening region 18 on the holding flange 14 over the collar 16. At this location, for example, the insulation piece 22 is always pushed on the collar 16 by the widening region 18 and therefore firmly seated on the holding flange 14. However, this is not absolutely imperative and the chosen exemplary embodiment merely shows one of the possible designs of the connection between the insulation piece 22 and the holding flange 14. The first insulation package 4 is held relative to the holding device 8 by the insulation piece 22.

The second insulation package 6 is held on the structural component 12 in such a way that an overlap 26 with the peripheral collar 16 of the holding device 8 is produced on one end 24 of the second insulation package 6, wherein the collar 16 is situated in the overlap 26 between the end 24 of the second insulation package 6 and the structural component 12. Condensation water arriving at the first insulation package 4 or the insulation piece 22 from the structural side in the region of the holding device 8 is guided toward the collar 16 along the collar 16 under the influence of the gravitational force, namely on a side 28 of the first insulation package 4 that is directed toward the structure, and then drains along the collar under the influence of the gravitational force in order to subsequently drip off the collar 18 in the overlapping region 26 and ultimately drain on the structure in the direction from a film 30 of the second insulation package 6 toward the structural side of the fuselage.

The structural component 12 shown is realized, for example, in the form of a fuselage frame that usually has a round or oval shape, at least in a fuselage of an airliner. Due to the wrapping of the structural component 12 with the second insulation package 6, it forms a channel that extends as far as a bilge of the aircraft fuselage. At this location, all incidental condensation water is collected such that the risk of being admitted into the passenger cabin is eliminated.

Figure 2A:
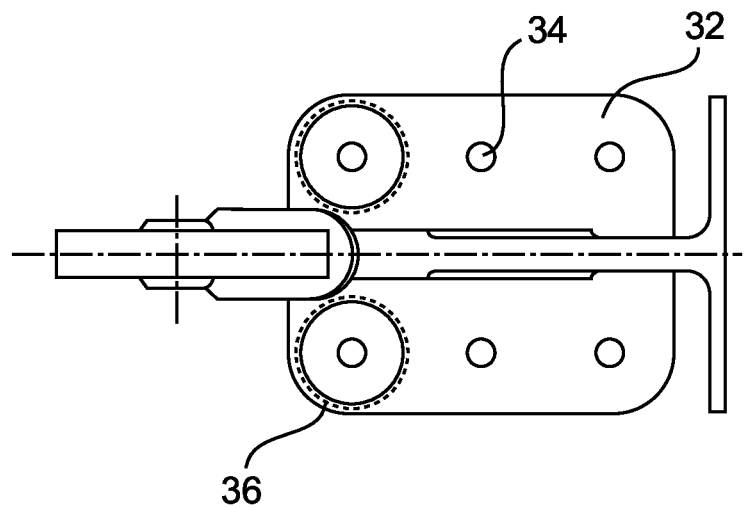
FIGS. 2a and 2b respectively show a top view and a side view a holding device.
Figure 2B:
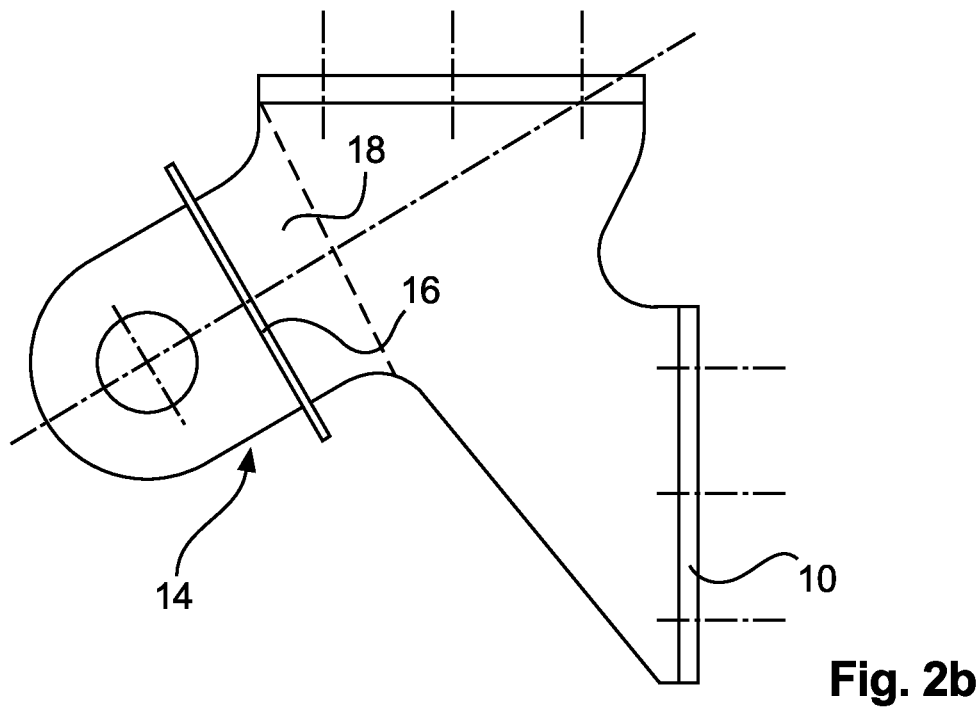

The illustrations in FIGS. 2a and 2b show the detailed design of the holding device 8. The first mounting surface 10 is supplemented with a second mounting surface 32, wherein rivet bores 34 are arranged in both mounting surfaces 10 and 32 in order to mount the holding device 8 on the structure side. The diameter 36 of a conventional riveting tool that is not impaired by the peripheral collar 16 is illustrated with broken lines. This riveting tool can be perpendicularly placed on the mounting surfaces 10 and 32, wherein this would not be possible if wider and/or multiple collars are used on the holding flange 14.

Figure 3:
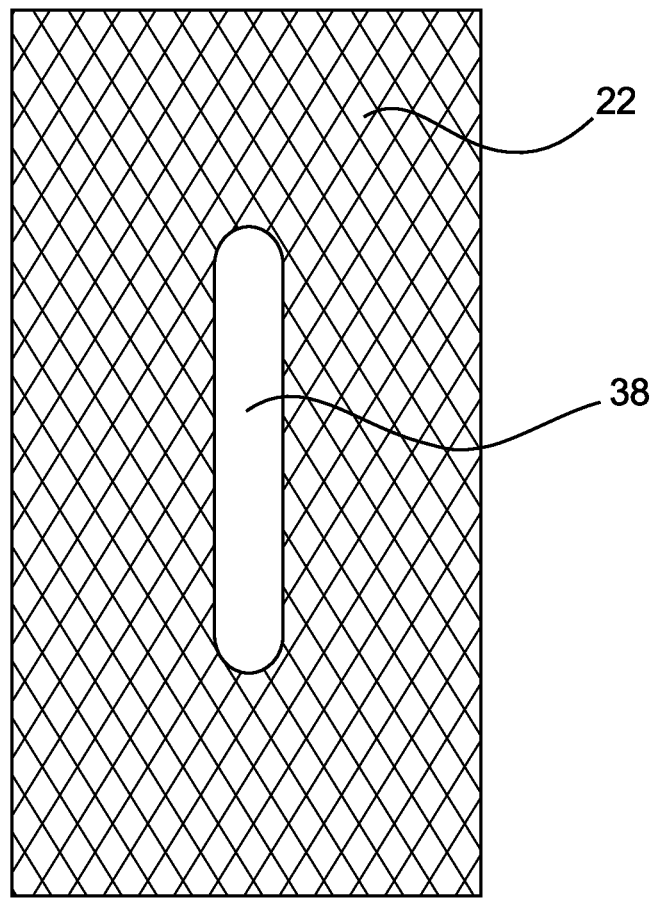
FIG. 3 shows a sectional representation of an insulation piece.

FIG. 3 additionally shows the insulation piece 22 that, for example, could have a thickness between 5 and 15 mm, as well as a rectangular cross section with, for example, non-rounded corners, and comprise a cutout 38 that is rounded in order to protect the material of the insulation piece 22. In the unstressed state, the cutout 38 could have a clear width that only lies a few millimeters above the clear width of the holding flange 14, for example, between 2 and 4 millimeters. However, this depends, in particular, on the material properties of the foam material used. The more rigid the foam material, the smaller the dimensional deviation required for the clamping can be realized.

Figure 4:
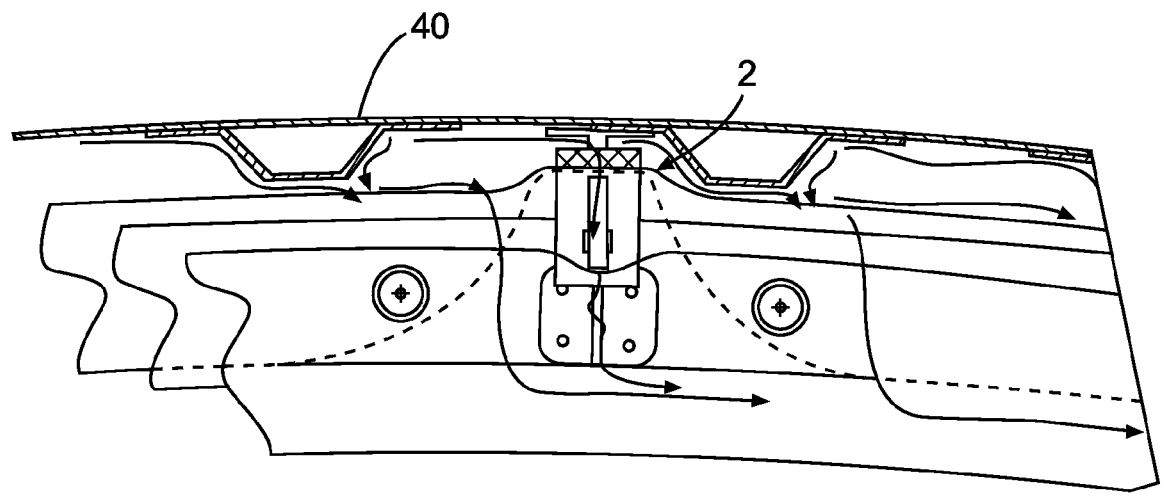
FIG. 4 shows a top view of an insulation arrangement according to an embodiment of the invention.

FIG. 4 shows an exemplary arrangement within an aircraft fuselage 40 on an upper side, wherein the geometric boundary conditions for a particularly simple drainage of condensation water are fulfilled. The angle achieved with the collar should be as steep as possible such that a sufficiently intense drainage of condensation water can be realized under the influence of the gravitational force. This angle may lie in the range between 0 and 70°, preferably in the range between 0 and 45° about a vertical axis of the aircraft fuselage 40. This angle therefore is dependent on the installation position of the holding device because the angle between the collar 16 and the first mounting surface 10 is superimposed on the local structural component angle. The prerequisites for realizing a sufficient angle of the collar 16 should be fulfilled, in particular, in an upper quarter of the aircraft fuselage 40.

Figure 5:
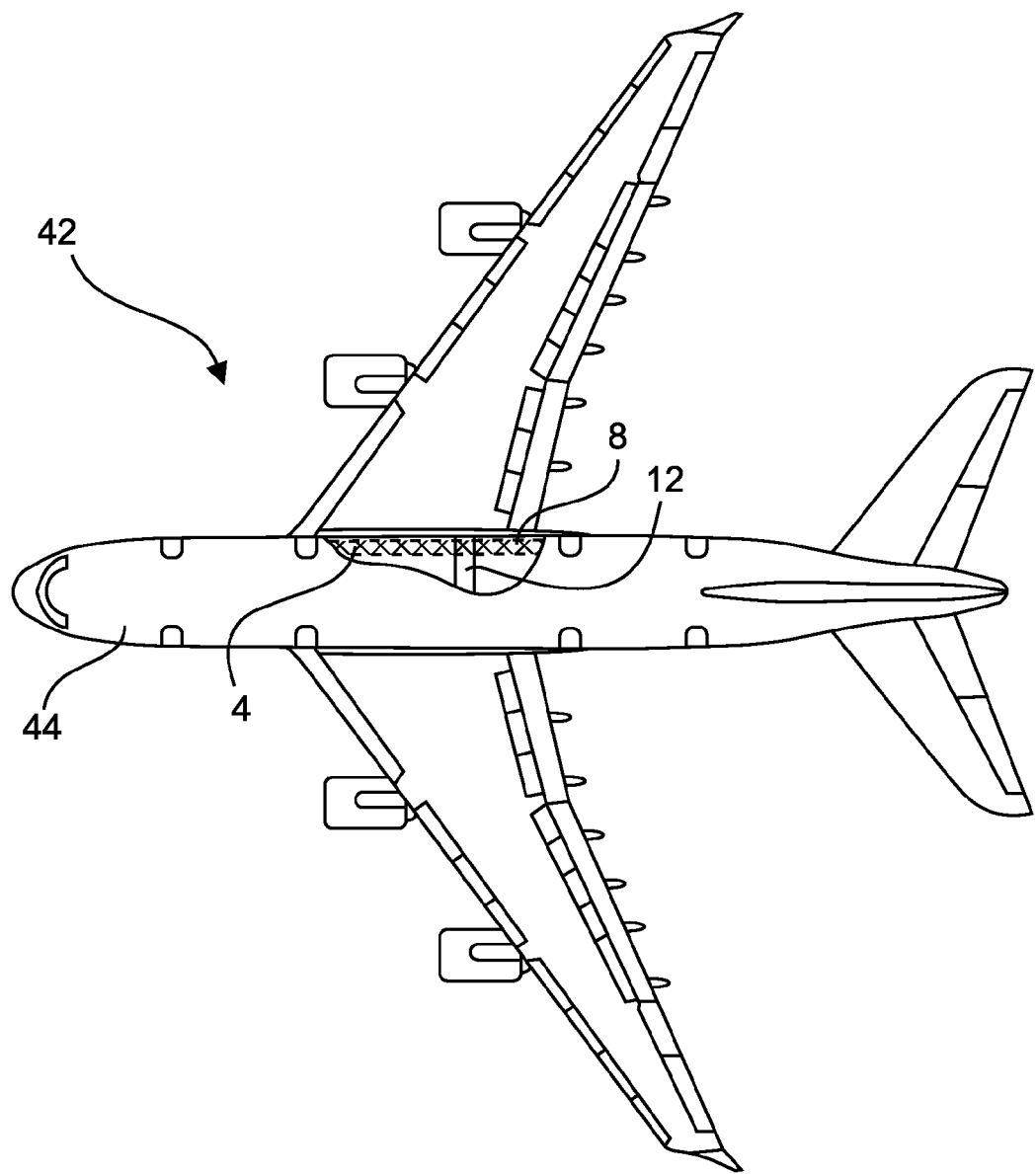
FIG. 5 shows an aircraft with at least one aircraft cabin and an insulation arrangement according to an embodiment of the invention.

FIG. 5 shows an aircraft 42 that comprises an aircraft fuselage 40 with a cabin 42 arranged therein. The cabin 42 may be equipped with an insulation arrangement 2 according to the invention, wherein the holding devices 8 could be arranged, for example, on the frames 12.

As a supplement, it should be noted that "comprising" does not exclude any other elements or steps, and that "a" or "an" does not exclude a plurality. It should furthermore be noted that characteristics that were described with reference to one of the above exemplary embodiments can also be used in combination with other characteristics of other above-described exemplary embodiments. Reference symbols in the claims should not be interpreted in a restrictive sense.

LIST OF REFERENCE SYMBOLS

2 Insulation arrangement
4 First insulation package
6 Second insulation package
8 Holding device
10 First mounting surface
12 Structural component
14 Holding flange
16 Collar
18 Widening region
20 Opening
22 Insulation piece
24 End
26 Overlap
28 Side directed toward structure
30 Film
32 Second mounting surface
34 Rivet bore
36 Diameter
38 Cutout
40 Aircraft fuselage
42 Aircraft
44 Cabin

The invention claimed is:

1. An insulation arrangement for thermally and acoustically insulating a cabin of an aircraft, comprising:
   at least one holding device;
   a first insulation package; and
   a second insulation package;
   wherein the holding device comprises at least a first mounting surface for mounting the holding device on a structural component of the aircraft and a holding flange that extends from the first mounting surface and comprises a peripheral collar;
   wherein the first insulation package comprises an opening for leading through the holding flange and an elastic, pliable insulation piece that is arranged on the opening and comprises a cutout that is narrower than the holding flange extending through the opening; and
   wherein the second insulation package comprises an end and is arranged on the structural component of the aircraft relative to the holding device in such a way that the end and the collar form an overlap, in which the collar lies between the end of the second insulation package and the first mounting surface.

2. The insulation arrangement of claim 1, wherein the holding flange comprises a widening region that is arranged between the collar and the first mounting surface and dimensioned such that the insulation piece produces a non-positive connection in the widening region.

3. The insulation arrangement of claim 1, wherein the insulation piece is made of a foam material.

4. The insulation arrangement of claim 1, wherein the first mounting surface is equipped with rivet bores.

5. The insulation arrangement of claim 1, wherein the holding flange extends in a first plane perpendicular to a second plane in which the first mounting surface extends.

6. The insulation arrangement of claim 1, wherein the angle, at which the peripheral collar extends relative to the first mounting surface, lies in the range of 0-45°.

7. The insulation arrangement of claim 1, wherein the peripheral collar extends outward from the holding flange by 2-5 mm.

8. The insulation arrangement of claim 1, wherein the collar extends parallel to a vertical line of an axis, along which the holding flange extends.

9. The insulation arrangement of claim 1, wherein the peripheral collar extends in a plane perpendicular to the holding flange.

10. The insulation arrangement of claim 1, wherein the peripheral collar is bent relative to a plane perpendicular to the holding flange.

11. An aircraft comprising a fuselage with a cabin arranged therein and holding devices for holding cabin components, wherein the aircraft fuselage is equipped with an insulation arrangement comprising:
   at least one holding device;
   a first insulation package; and
   a second insulation package;
   wherein the holding device comprises at least a first mounting surface for mounting the holding device on a structural component of the aircraft and a holding flange that extends from the first mounting surface and comprises a peripheral collar;
   wherein the first insulation package comprises an opening for leading through the holding flange and an elastic, pliable insulation piece that is arranged on the opening and comprises a cutout that is narrower than the holding flange extending through the opening; and
   wherein the second insulation package comprises an end and is arranged on the structural component of the aircraft relative to the holding device in such a way that the end and the collar form an overlap, in which the collar lies between the end of the second insulation package and the first mounting surface.

* * * * *